United States Patent
Miller (10) Patent No.: US 7,265,896 B2
(45) Date of Patent: Sep. 4, 2007

(54) OPTICAL POWER COMBINING FOR OPTICAL FREQUENCY CONVERSION HAVING NONLINEAR FEEDBACK

(75) Inventor: Gregory D. Miller, Sunnyvale, CA (US)

(73) Assignee: Collinear Corporation, Santa Clara, CA (US)

( * ) Notice: Subject to any disclaimer, the term of this patent is extended or adjusted under 35 U.S.C. 154(b) by 23 days.

(21) Appl. No.: 11/143,881

(22) Filed: Jun. 1, 2005

(65) Prior Publication Data

US 2006/0132901 A1    Jun. 22, 2006

Related U.S. Application Data

(60) Provisional application No. 60/637,260, filed on Dec. 17, 2004.

(51) Int. Cl.
  *G02F 1/35* (2006.01)
  *G02F 1/39* (2006.01)
  *G02B 6/00* (2006.01)

(52) U.S. Cl. .......................... 359/326; 385/15; 385/37
(58) Field of Classification Search ........ 359/326–332; 385/37
See application file for complete search history.

(56) References Cited

U.S. PATENT DOCUMENTS

| 4,616,898 | A | * | 10/1986 | Hicks, Jr. ..................... 385/24 |
|---|---|---|---|---|
| 4,784,450 | A | * | 11/1988 | Jain et al. .................... 359/332 |
| 4,923,270 | A | | 5/1990 | Carter ...................... 350/96.18 |
| 5,115,444 | A | | 5/1992 | Kirkby et al. ................ 372/50 |
| 5,163,058 | A | | 11/1992 | Farries et al. .................. 372/6 |
| 5,351,262 | A | | 9/1994 | Poguntke et al. ........... 372/102 |
| 5,428,635 | A | | 6/1995 | Zhiglinsky et al. ........... 372/92 |
| 5,946,331 | A | | 8/1999 | Amersfoort et al. .......... 372/23 |
| 6,041,072 | A | | 3/2000 | Ventrudo et al. ........... 372/102 |
| 6,052,394 | A | | 4/2000 | Lee et al. ...................... 372/6 |
| 6,097,540 | A | | 8/2000 | Neuberger et al. .......... 359/618 |
| 6,192,062 | B1 | | 2/2001 | Sanchez-Rubio et al. ..... 372/92 |
| 6,456,756 | B1 | | 9/2002 | Mead et al. .................. 385/24 |
| 6,567,580 | B2 | | 5/2003 | Bacher et al. ................ 385/24 |
| 6,665,471 | B1 | | 12/2003 | Farmer et al. ................ 385/37 |
| 6,867,903 | B2 | * | 3/2005 | Imajuku et al. ............. 359/330 |
| 7,012,740 | B2 | * | 3/2006 | Imajuku et al. ............. 359/330 |

* cited by examiner

*Primary Examiner*—Michelle Connelly-Cushwa
(74) *Attorney, Agent, or Firm*—Lumen Intellectual Property Services, Inc.

(57) ABSTRACT

Wavelength combining for nonlinear frequency conversion is provided having nonlinear feedback to the sources being combined. Power that is fed back to the sources is obtained from within a wavelength conversion device. Therefore, the feedback power to a source has a nonlinear dependence on input power provided by that source to the wavelength conversion device. Such nonlinear feedback can advantageously reduce the sensitivity of the output power from the wavelength conversion device to variations in the nonlinear coefficients of the conversion device. The reason for this reduced sensitivity is that in preferred embodiments, the feedback power increases if a nonlinear coefficient decreases. This increased feedback tends to increase the power supplied to the conversion device, thus mitigating the effect of the reduced nonlinear coefficient.

27 Claims, 5 Drawing Sheets

OPTICAL POWER COMBINING FOR OPTICAL FREQUENCY CONVERSION HAVING NONLINEAR FEEDBACK

This application claims the benefit of US provisional patent application No. 60/637,260, filed on Dec. 17, 2004, entitled "Optical Power Combining for Optical Frequency Conversion Having Nonlinear Feedback".

FIELD OF THE INVENTION

This invention relates to optical power combining for providing pump radiation to an optical frequency converter.

BACKGROUND

Many optical processes of interest for various applications generally have improved performance as the input optical power increases. For example, the efficiency of second harmonic generation increases as the input power increases. Accordingly, methods for providing high optical power are of considerable interest. High optical power can be provided by a single high power source, or by effectively combining the outputs of two or more low power sources to provide a high power combined output. This second approach is generally referred to as optical power combining.

In most cases, it is desirable for the combined output radiation to be in a single spatial mode. Imposing the requirement of a single spatial mode combined output has significant consequences for optical power combining. In particular, interference between the optical inputs will occur in the combined single mode output unless the optical inputs are distinguishable (e.g., have different wavelengths and/or different states of polarization). In order to obtain power combining of interfering optical inputs, phase coherence of these optical inputs must be established, which typically requires implementation of an elaborate optical phase locking scheme. Accordingly, in applications that permit the use of distinguishable optical inputs, combination of distinguishable inputs is usually preferred. Such power combiners are often referred to as wavelength combiners, since radiation at different wavelengths is combined into a single spatial mode combined output. In this description, optical power combining is understood to include both wavelength combining and/or polarization combining.

A typical wavelength combiner has two or more input ports and a single output port, where each input port i has a corresponding wavelength acceptance range $\Delta\lambda_i$ which is efficiently coupled to the output port. The wavelength ranges $\Delta\lambda_i$ are substantially non-overlapping. One way to utilize such a wavelength combiner to combine the outputs of several lasers is to provide a set of lasers in one-to-one correspondence with the input ports, such that each laser has a fixed emission wavelength within the acceptance range $\Delta\lambda$ for the corresponding input port. For example, such lasers could be semiconductor DFB lasers. While this approach is straightforward, it suffers from the disadvantage that providing lasers having emission wavelengths within the specified ranges can be costly in cases where the ranges are narrow. This cost issue is especially notable in cases where a large number of lasers are to be combined. Such wavelength combining by precisely selecting the wavelength of individual emitters is considered in U.S. Pat. No. 6,456,756.

An alternative approach for diode laser wavelength combining is to provide a set of diode lasers in one-to-one correspondence with the input ports, such that each laser has an emission wavelength which can be in any of the wavelength ranges $\Delta\lambda_i$. Since diode lasers tend to have a broad gain bandwidth, provision of such lasers is relatively straightforward (e.g., such lasers could be Fabry-Perot diode lasers). In this approach, a broadband partial reflector is optically coupled to the output port of the wavelength combiner. The combination of wavelength combiner and reflector provides wavelength-dependent feedback to each laser source. This linear feedback acts to set the emission wavelength of each laser source appropriately for wavelength combining. For example, a laser source coupled to a port j having an acceptance range $\Delta\lambda_j$ will receive more feedback in the range $\Delta\lambda_j$ than at other wavelengths, which will tend to force this source to lase at a wavelength within the range $\Delta\lambda_j$. With this approach, multiple diode lasers can be wavelength combined without the need for precise wavelength control of each laser diode. Thus less expensive laser diodes can be used. Such wavelength combining with linear feedback is considered in U.S. Pat. No. 6,567,580 and in U.S. Pat. No. 6,041,072.

However, certain problems which can arise in the context of wavelength combining are not addressed by the above approaches. An example of such a problem can arise in the context of wavelength combining to provide pump radiation for a parametric nonlinear optical process which is efficient over a relatively broad wavelength range. When either of the above approaches is used to provide wavelength combined pump radiation, the resulting pump radiation has a pump spectrum that is independent of the nonlinear optical process conversion efficiency. Since the pump spectrum remains fixed, careful and costly design of the broadband optical frequency converter can be required to obtain roughly constant conversion efficiency within the desired wavelength range.

Accordingly, it would be an advance in the art to provide wavelength combining for broadband optical frequency conversion that can automatically equalize conversion efficiency within a conversion wavelength range.

SUMMARY

Wavelength combining for nonlinear frequency conversion is provided having nonlinear feedback to the sources being combined. Power that is fed back to the sources is obtained from within a wavelength conversion device. Therefore, the feedback power to a source has a nonlinear dependence on input power provided by that source to the wavelength conversion device. Such nonlinear feedback can advantageously reduce the sensitivity of the output power from the wavelength conversion device to variations in the nonlinear coefficients of the conversion device. The reason for this reduced sensitivity is that in preferred embodiments, the feedback power increases if a nonlinear coefficient decreases. This increased feedback tends to increase the power supplied to the conversion device, thus mitigating the effect of the reduced nonlinear coefficient.

DETAILED DESCRIPTION

Figure 1:
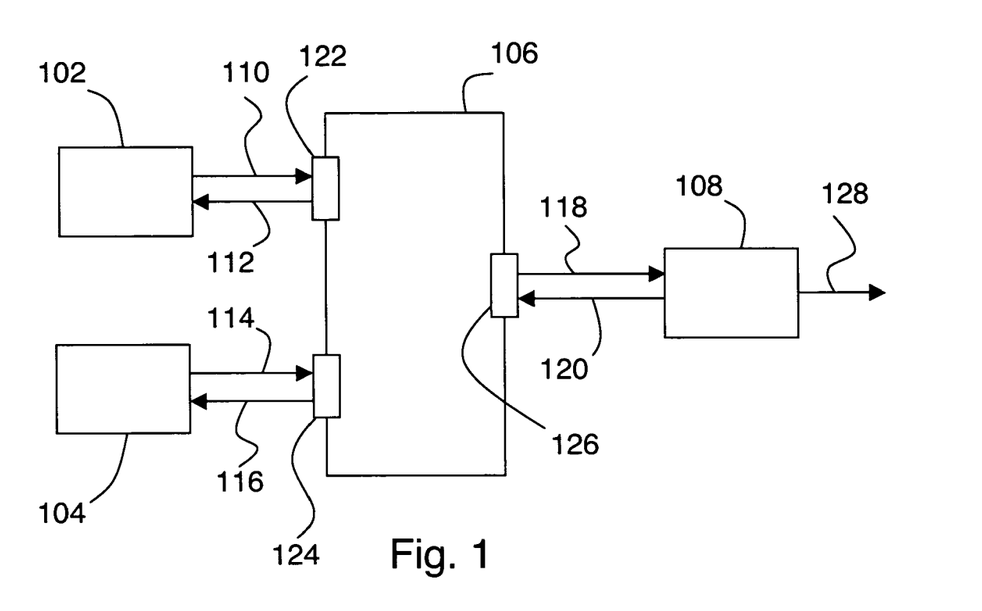
FIG. 1 is a block diagram of an embodiment of the invention.

FIG. 1 is a block diagram of an exemplary embodiment of the invention. An optical source 102 emits optical radiation 110 toward an input port 122 of a combiner 106. Similarly, another optical source 104 emits optical radiation 114 toward another input port 114 of combiner 106. Combiner 106 has a combiner output port 126, which emits combined radiation 118. Combined radiation 118 is received by an optical frequency converter 108, which provides output optical radiation 128. Optical frequency converter 108 also provides feedback radiation 120 to combiner output port 126. Combiner 106 splits feedback radiation 120 to provide source feedback radiation 112 emitted from input port 122 and source feedback radiation 116 emitted from input port 124. Source feedback radiation 112 is received by source 102, and source feedback radiation 116 is received by source 104. Radiation 110 and 112 between source 102 and combiner 106 can propagate in any combination of free space and/or guiding structure (e.g., an optical fiber or any other optical waveguide). Radiation 114, 116, 118 and 120 can also propagate in any combination of free space and/or guiding structure.

Suitable sources 102 and 104 include any source of optical radiation having an emission wavelength that is influenced by optical feedback. Such sources include lasers, and are preferably semiconductor diode lasers. For example, sources 102 and 104 can be elements of an array of semiconductor lasers. Sources other than lasers can also be employed (e.g., an optical frequency converter can be used as a source). Although two sources are shown on FIG. 1, the invention can also be practiced with more than two sources. Combiner 106 is shown in general terms as a three port device having ports 122, 124, and 126. Although ports 122 and 124 are referred to as input ports, and port 126 is referred to as a combiner output port, these ports are generally bidirectional and can both receive and emit optical radiation as indicated above. For example, if combiner 106 is fiber (or waveguide) coupled, then the input and output fibers (or waveguides) act as ports 122, 124, and 126, and such ports are clearly bidirectional. In general, there is a one to one correspondence between input ports and sources to be combined, so if N sources are being combined, the combiner has N corresponding input ports.

Combiner 106 preferably includes a wavelength dispersive element, along with some optical elements to define the ports. Suitable wavelength dispersive elements include arrayed waveguide gratings, reflective diffraction gratings, transmissive diffraction gratings, holographic optical elements, assemblies of wavelength-selective filters, and photonic band-gap structures. Thus combiner 106 is preferably a wavelength combiner, where each of the input ports (indexed by i) has a corresponding input port wavelength range $\Delta\lambda_i$ for efficient coupling to the combiner output port. The wavelength ranges $\Delta\lambda_i$ are substantially non-overlapping. In most cases, it is preferred for each of the ports to be a single spatial mode port, to avoid problems associated with partitioning of optical power among several spatial modes.

Various optical processes can occur within optical frequency converter 108, including but not limited to harmonic generation, sum frequency generation, difference frequency generation, parametric generation, parametric amplification, parametric oscillation, three-wave mixing, four-wave mixing, stimulated Raman scattering, stimulated Brillouin scattering, stimulated emission, acousto-optic frequency shifting and electro-optic frequency shifting.

In general, optical frequency converter 108 accepts optical inputs at an input set of optical wavelengths and provides an optical output at an output set of optical wavelengths, where the output set differs from the input set.

Optical frequency converter 108 can include nonlinear optical materials such as lithium niobate, lithium tantalate, potassium titanyl phosphate, potassium niobate, quartz, silica, silicon oxy-nitride, gallium arsenide, lithium borate, and beta-barium borate. Optical interactions in optical frequency converter 108 can occur in various structures including bulk structures, waveguides, quantum well structures, quantum wire structures, quantum dot structures, photonic bandgap structures, and multi-component waveguide structures.

In cases where optical frequency converter 108 provides a parametric nonlinear optical process, this nonlinear optical process is preferably phase-matched. Such phase-matching can be birefringent phase-matching or quasi-phase-matching. Poling of a ferroelectric material to provide poled domains is a preferred approach for providing quasi-phase-matching. Such poled domains can be periodic or they can be aperiodic. Aperiodic poling can be used to alter the phase-matching bandwidth in a controllable manner. For example, broadband quasi-phase-matching (i.e., having a phase-matching wavelength FWHM bandwidth greater than about 0.01% of an input optical wavelength) can be provided by aperiodic poling.

Optical frequency converter 108 can also include various elements to improve its operation. For example, it can include a wavelength selective reflector for wavelength selective output coupling, and/or a wavelength selective reflector for wavelength selective resonance, and/or a wavelength selective loss element for controlling the spectral response of the converter.

Figure 2:
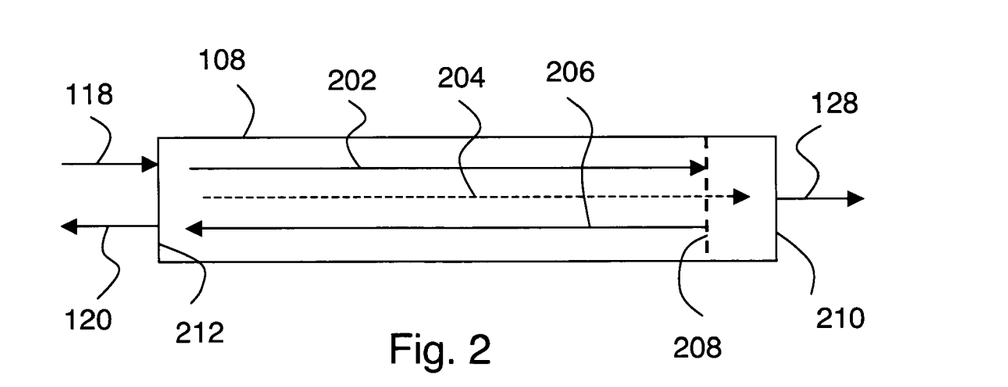
FIG. 2 shows an optical frequency converter for use in an embodiment of the invention.

FIG. 2 shows in more detail how feedback radiation 120 is provided by an exemplary optical frequency converter 108 which provides parametric frequency conversion. Combined radiation 118 provides forward radiation 202 within frequency converter 108. Forward radiation 202 propagates to the right on FIG. 2, and parametric radiation 204, also propagating to the right on FIG. 2 is generated within frequency converter 108. Parametric radiation 204 is emitted from frequency converter 108 as output optical radiation 128. Typically there is a net power transfer from forward radiation 202 to parametric radiation 204 as the interaction proceeds (i.e., as the radiation propagates to the right in this example). A reflector 208 is disposed in frequency converter 108 to reflect (or partially reflect) forward radiation 202 to provide backward radiation 206. Alternatively, in some cases it is desirable to dispose reflector 208 external to frequency converter 108, after endface 210. Backward radiation 206 is emitted from frequency converter 108 as feedback radiation 120. Reflector 208 can be wavelength dependent, such that parametric radiation 204 is transmitted through reflector 208 with greater efficiency than forward radiation 202. Alternatively, in some cases the desired power reflectivity of reflector 208 for forward beam 202 will be sufficiently low (e.g., 1% or less) that there is no need to provide significantly higher transmittance for radiation 204 than for radiation 202. Reflector 208 can be a grating, an internal interface, a coated or uncoated endface, or any combination thereof. The preferred level of reflectivity for reflector 208 is greater than 90%.

The forward power (i.e., power of radiation 202) incident on reflector 208 will depend on the efficiency of the parametric nonlinear process in this example. More specifically, as the process efficiency increases, the forward power decreases due to pump depletion. Accordingly, the backward power (i.e., power of radiation 206) and the feedback power also depend on the process efficiency. This situation is referred to as "nonlinear feedback" and is a key feature of the invention. Note that the position of reflector 208 determines how nonlinear the feedback is. For example, a reflector located at an input interface 212 provides purely linear feedback (i.e., feedback that does not depend on the process efficiency). A reflector located at an output interface 210 provides a maximum degree of nonlinear feedback, since the dependence of forward power on process efficiency is maximized at the output interface (assuming a phase-matched parametric interaction).

It is helpful to consider a case where the combiner has N input ports that are indexed with an integer i that runs from 1 to N. The optical sources each provide source radiation having an input power $P_i$ to each port i. At least one of these sources will also receive feedback radiation having a power $F_i$ from port i (i.e., at least one of the $F_i$ is non-zero). Typically, the embodiment of FIG. 1 is operated at a nominal operating point, where each source i provides a nominal operating power $OP_i$ to its corresponding port. Both the source radiation and the feedback radiation can include one or several optical wavelengths or wavelength ranges. The wavelengths of the source and feedback radiation can be the same or they can be different.

Figure 3:
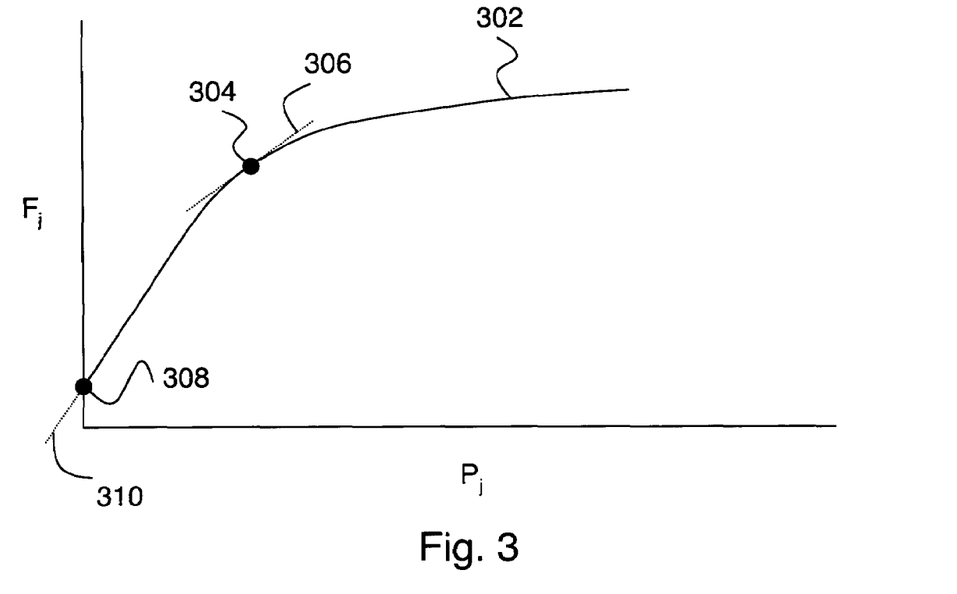
FIG. 3 shows feedback power $F_j$ vs. input power $P_j$ for a port j in an embodiment of the invention.

FIG. 3 is a plot showing some general features of nonlinear feedback. On FIG. 3, the dependence of feedback power $F_j$ on input power $P_j$ for a selected port j is shown, where $P_i = OP_i$ for i≠j is assumed (i.e., inputs to ports other than port j are assumed to be nominal). When $P_j$ is zero, $F_j$ can be non-zero (as shown by point 308 on FIG. 3), since inputs to ports other than port j can contribute to $F_j$ even when $P_j$ is zero (e.g., by nonlinear scattering). For $P_j$ close to zero, the dependence of $F_j$ on $P_j$ is approximately linear, as expected from a first order Taylor expansion. The slope of line 310 is given by the partial derivative $\partial F_j/\partial P_j$ evaluated at $P_j = 0$. As indicated above in connection with FIG. 2, the dependence of $F_j$ on $P_j$ can be nonlinear. For example, suppose the nominal value of $P_j$ (i.e., $P_j = OP_j$) corresponds to point 304 on FIG. 3, where curve 302 has clearly departed from its linear behavior for $P_j$ near zero. This nonlinearity can be expressed in terms of the slope of line 306, which is given by the partial derivative $\partial F_j/\partial P_j$ evaluated at $P_j = OP_j$. The nominal operating point features nonlinear feedback to source j if the slopes of lines 306 and 310 differ (i.e., if $\partial F_j/\partial P_j$ evaluated at $P_j = OP_j$ differs from $\partial F_j/\partial P_j$ evaluated at $P_j = 0$).

All embodiments of the invention have such nonlinear feedback with respect to at least one of the sources, and in many embodiments, such nonlinear feedback is provided to all of the sources. Such nonlinear feedback can advantageously lead to more spectrally homogeneous pumping of a broadband wavelength converting process, since spectral portions of the input pump radiation that are less efficiently converted will tend to experience greater feedback. This enhanced feedback can lend to increased pump power in such spectral regions, thereby increasing conversion efficiency. In this manner, automatic equalization of conversion efficiency can be obtained.

Figure 4:
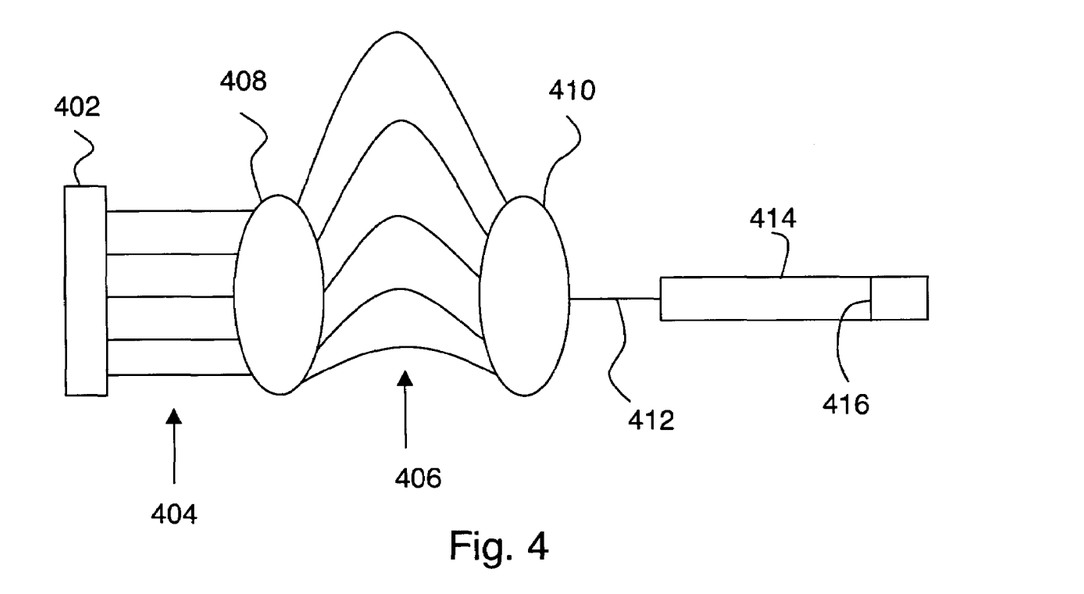
FIG. 4 shows a preferred embodiment of the invention.

FIG. 4 shows a preferred embodiment of the invention. An array of diode lasers 402 has lasing elements in one to one correspondence with (and coupled to) waveguides 404. Each of waveguides 404 acts as an input port (such as ports 122 and 124 on FIG. 1). Waveguides 404 are coupled to a planar waveguide star coupler 408. Star coupler 408 is coupled to another planar waveguide star coupler 410 by waveguides 406 having different lengths. The combination of star couplers 408 and 410 with waveguides 406 is an arrayed waveguide grating, and acts as a wavelength combiner (e.g., 106 on FIG. 1) providing combined output 118 to waveguide 412. Waveguide 412 provides combined output 118 to a waveguide optical frequency converter 414. Within optical frequency converter 414, a reflector 416 provides a back reflection of combined radiation 118. As indicated above in connection with FIGS. 2 and 3, this back reflection provides nonlinear feedback according to the invention. The embodiment of FIG. 4 can be advantageously realized with planar lightwave circuit technology, where complete or partial integration can be employed to reduce part count and alignment requirements, which reduces cost.

Figure 5:
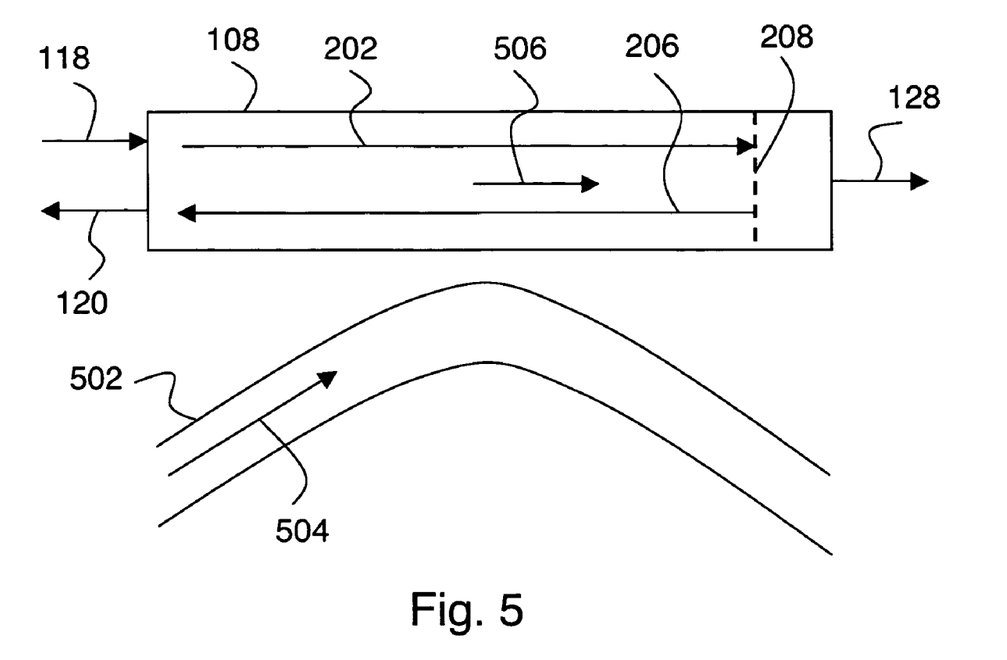
FIG. 5 shows an embodiment of the invention including a directional coupler for input of pump radiation.

FIG. 5 shows a portion of an alternate embodiment of the invention. In this example, optical frequency converter 108 is a waveguide device, which enables pumping schemes in addition to those available for bulk devices. In this embodiment, combined radiation 118 is coupled into optical frequency converter 108 as discussed in connection with FIG. 2 (e.g., through a waveguide endface). Additional pump radiation is provided to optical frequency converter 108 with a directional coupler. More specifically, a second waveguide 502 is disposed such that its core is in close proximity to the core of the waveguide in frequency converter 108. As known in the art, this arrangement of waveguides functions as a directional coupler, such that radiation 504 in waveguide 502 can provide additional radiation 506 in optical frequency converter 108.

In such an arrangement, it is preferable to prevent significant coupling of forward radiation 202 from converter 108 to waveguide 502. Such coupling can be avoided by providing radiation 504 at wavelengths other than the wavelengths of forward radiation 202. In this case, a wavelength-dependent directional coupler can couple radiation 504 into converter 108 without coupling radiation 202 into fiber 502. Alternatively, additional radiation 506 can be coupled into converter 108 at a location where forward radiation 202 is substantially depleted. In this case, radiation 506 can include wavelengths present in forward radiation 202, since coupling of (depleted) forward radiation 202 to waveguide 502 would not be of significant concern. Additional pumping of converter 108 can also be provided by bi-directional pumping (e.g., providing additional combined radiation (not shown) to end face 210 of converter 108 on FIG. 2).

The preceding description relates to standing wave feedback configurations, where the feedback power propagates backward along the same path followed by the input power. The invention is also applicable to traveling wave feedback configurations, where the feedback re-enters the gain medium at a different point than the input power is emitted from. Such traveling wave feedback is considered in the following numerical example.

Figure 6A:
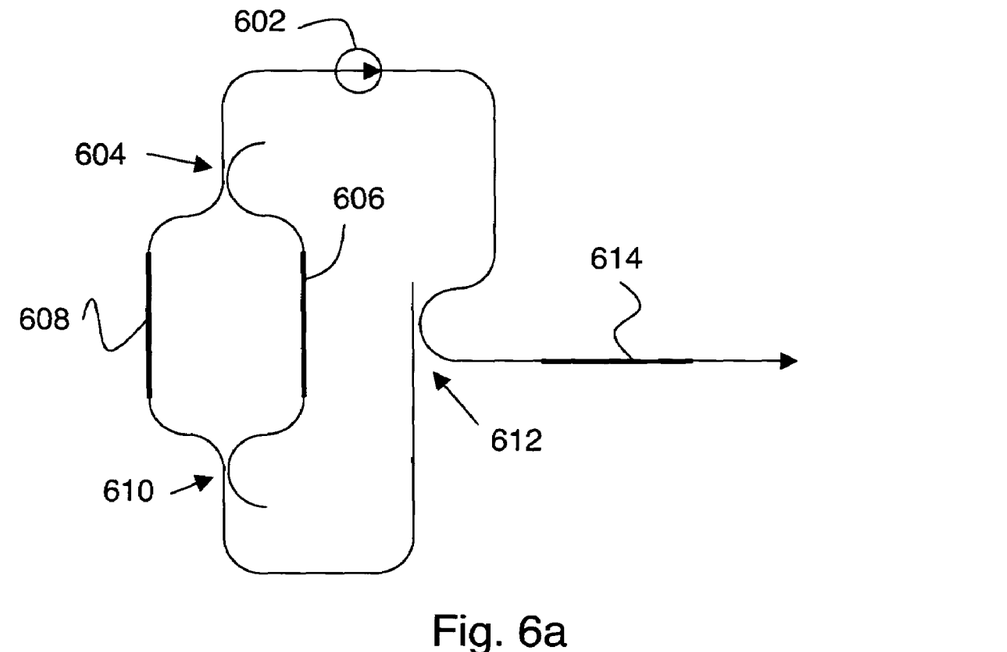
FIGS. 6a-b show configurations for a comparison between linear feedback (FIG. 6a) and nonlinear feedback according to an embodiment of the invention (FIG. 6b).
Figure 6B:
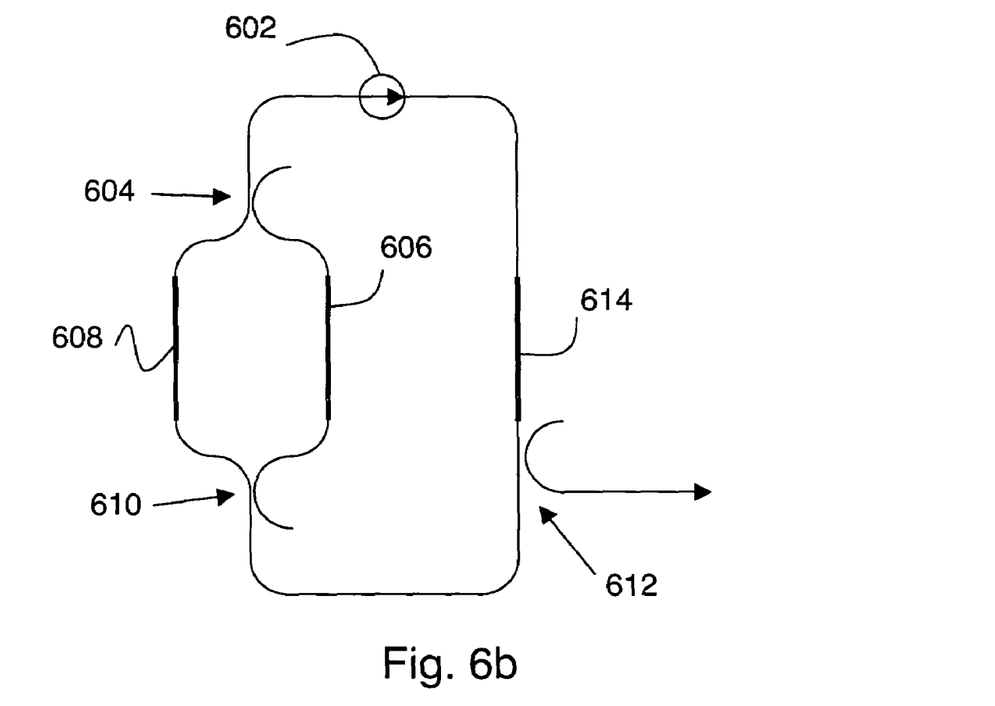

FIGS. 6a-b show configurations for a comparison between linear feedback (FIG. 6a) and nonlinear feedback according to an embodiment of the invention (FIG. 6b). FIG. 6a shows a unidirectional ring laser configuration having linear feedback to the gain elements. More specifically, gain elements 606 and 608 are coupled by wavelength selective couplers 604 and 610 such that they operate at distinct wavelengths. An isolator 602 ensures unidirectional propagation in the ring. A tap 612 directs a fraction of the circulating power toward a wavelength conversion device 614, and directs the remaining circulating power toward gain elements 606 and 608. Since this remaining power does not depend on the efficiency of wavelength conversion device 614, the feedback is linear in this case.

The configuration of FIG. 6b is similar to that of FIG. 6a, except that wavelength conversion device 614 is part of the ring, and tap 612 directs wavelength converted power out of the ring, and directs circulating pump power to gain elements 606 and 608. Since the pump power at tap 612 depends on the efficiency of wavelength conversion device 614, the feedback is nonlinear in this case.

In this example, the gain elements are modeled with a standard rate equation model, and SFG and SHG in conversion device 614 are accounted for. The following numerical parameters were employed for calculations. Each gain element has an unsaturated gain of 30 dB, a loss of 20 dB, a unity gain power of 1 W and a length of 2 mm. The two wavelengths of operation are 1064 nm and 1063 nm. On FIG. 6a, tap 612 output couples 91.7% of the circulating power, which maximizes the power provided to conversion device 614. With this configuration, each gain element provides 771 mW of light. On FIG. 6b, tap 612 is assumed to output couple all frequency converted light and is assumed to return all pump light to wavelength selective coupler 610. The effective nonlinear coefficients in device 614 on FIG. 6a for SFG and SHG are assumed to be 0.761 pm/V, which provides 50% total (i.e. including both SFG and SHG) conversion efficiency when device 614 is taken to be a 1 cm long waveguide of quasi-phasematched near-stoichiometric lithium tantalate with a 10 μm² mode area. Wavelength conversion device 614 on FIG. 6b has nonlinear coefficients about twice that of wavelength conversion device 614 on FIG. 6a, in order to optimize the nonlinear output coupling of FIG. 6b.

Certain advantages of the invention can be appreciated by considering some aspects of quasi-phasematching technology. More specifically, quasi-phasematched devices rely on formation of a specific domain pattern to provide a large effective nonlinearity. Process induced variations in such domain patterns can therefore lead to large part to part variation in nonlinear optical properties. For example, the effective nonlinearity for SFG in a waveguide can be degraded relative to the effective nonlinearity for SHG. The following example shows how the effect of such a variation can be mitigated by nonlinear feedback according to the invention.

Figure 7:
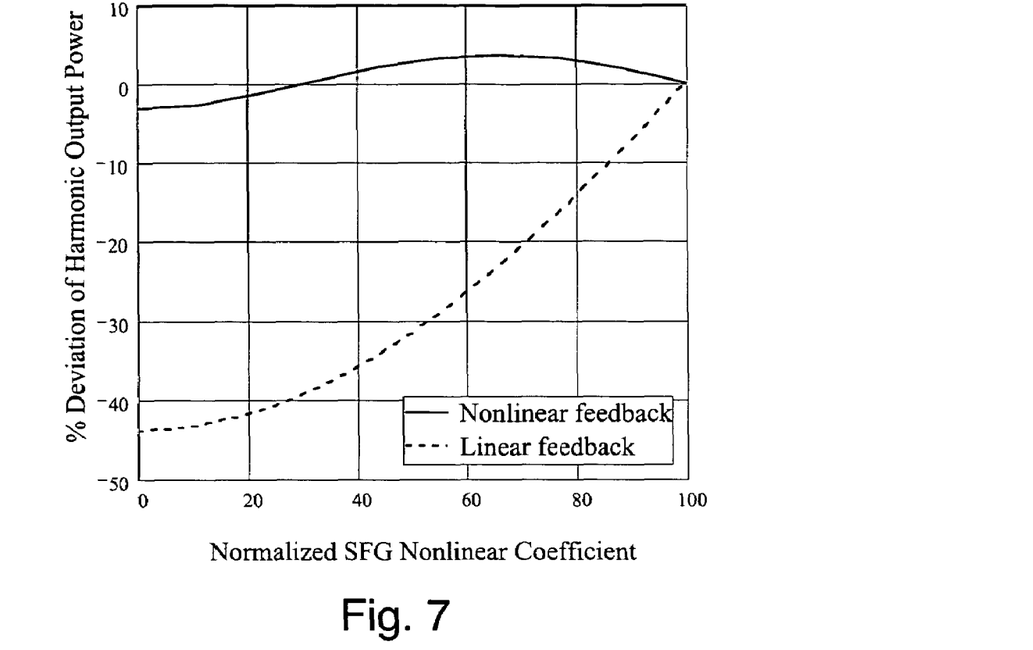
FIG. 7 shows total nonlinear output power vs. normalized SFG nonlinear coefficient for the configurations of FIGS. 6a-b.

FIG. 7 shows total nonlinear output power vs. normalized SFG nonlinear coefficient for the configurations of FIGS. 6a-b. The total nonlinear output power of FIG. 7 is the combined power due to SHG of the 1064 nm pump, SHG of the 1063 nm pump, and SFG from both pumps. The case of linear feedback (FIG. 6a) is shown with a dotted line, and nonlinear feedback (FIG. 6b) is shown with a solid line. In the linear feedback case, decreasing the SFG nonlinearity causes a significant decrease in output power. In the nonlinear feedback case, the nonlinear power does not significantly decrease as the SFG coefficient is decreased. The reason for the difference is that in the nonlinear case, unused pump power is returned to the gain elements, while in the linear case, unused pump power is simply lost. More specifically, decreasing the SFG coefficient in device 614 on FIG. 6a causes the amount of pump power exiting from device 614 to increase. Since this extra pump power does not remain within the laser, it is lost. In contrast, decreasing the SFG coefficient in device 614 on FIG. 6b causes the amount of pump power exiting from device 614 to increase, which in turn leads to increased feedback power to coupler 610. In this case, the extra pump power remains within the laser, thereby increasing the circulating pump power. Increasing the circulating pump power increases the efficiency of the nonlinear processes, and thereby leads to reduced sensitivity to variation in nonlinear coefficient as shown on FIG. 7.

Figure 8:
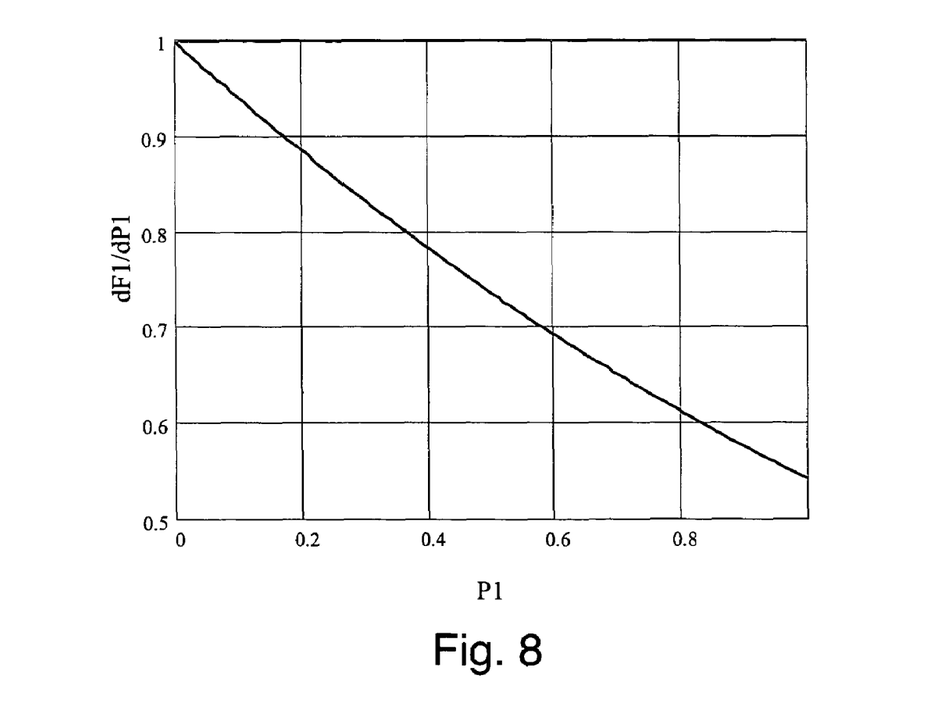
FIG. 8 shows the dependence of the feedback derivative on power for the example of FIG. 6b.

FIG. 8 shows the dependence of the feedback derivative on power for the example of FIG. 6b. As indicated above, the partial derivative of feedback power with respect to input power is one way to quantify nonlinear feedback. In the calculation of FIG. 8, the output power of one of the sources (laser 2) is set to zero, and the dependence of feedback derivative on input power to the converter is plotted. Similar results would be obtained if the calculation were performed with laser 2 at a non-zero operating point. As P1 increases, the derivative $\partial F1/\partial P1$ decreases, because of SHG in waveguide 614. This decrease in feedback derivative as power increases is a general feature of nonlinear feedback according to the invention.

In this case, nonlinear feedback results in decreasing feedback derivative with increasing input power, creating a power limiting function (e.g., as shown on FIG. 3). If the effective nonlinear coefficient in fabricated parts is lower than the design target, feedback F1 increases which increases input power P1. In the case where two or more lasers are power combined, reductions in an effective nonlinear coefficient for a process driven by P1 results in increased circulating power at P1 which can drive other nonlinear processes driven by P1 more efficiently (e.g., as in the example of FIG. 7, where reduction of an SFG coefficient increased circulating pump power with a corresponding increase in SHG efficiency). Nonlinear feedback thus advantageously provides wavelength conversion that is much less sensitive to variations in effective nonlinear coefficient than a linear feedback arrangement. Such reduced sensitivity reduces fabrication cost by increasing yield, since requirements placed on the wavelength converter effective nonlinear coefficients can be relaxed.

What is claimed is:

1. An optical apparatus comprising:
    a) a combiner having a combiner output port and having $N \geq 2$ input ports indexed with an integer i;
    b) a set of N optical radiation sources in one to one correspondence with said input ports, each of said sources providing input optical radiation having an input power $P_i$ to said corresponding input port; and
    c) an optical frequency converter optically coupled to said combiner output port and providing output optical radiation;
    wherein at least one of said sources receives source feedback optical radiation having a non-zero feedback power $F_i$ from said frequency converter,
    wherein said source feedback optical radiation is optically coupled to said at least one of said sources to provide optical feedback,
    wherein said feedback power $F_i$ has a nonlinear dependence on the corresponding input power $P_i$.

2. The apparatus of claim 1, wherein said optical frequency converter provides said feedback radiation to said combiner output port, and wherein said combiner splits said feedback radiation to provide feedback to said optical radiation sources.

3. The apparatus of claim 1, further comprising a feedback coupler distinct from said combiner, wherein said feedback coupler provides said feedback radiation to said sources.

4. The apparatus of claim 1, wherein at least one partial derivative $\partial F_i/\partial P_j$, indexed by at least one integer j where $1 \leq j \leq N$, takes on different values at a nominal operating point ($P_i=OP_i$ for $1 \leq i \leq N$, where $OP_i$ is an operating power for source i) and at a zero operating point ($P_i=0$ for i=j, $P_i=OP_i$ for i≠j).

5. The apparatus of claim 1, wherein each of said optical radiation sources comprises a laser.

6. The apparatus of claim 5, wherein each of said optical radiation sources comprises a laser diode.

7. The apparatus of claim 6, wherein said laser diodes are included in one or more laser diode arrays.

8. The apparatus of claim 1, wherein at least one of said sources comprises an input optical frequency converter.

9. The apparatus of claim 1, wherein said optical frequency converter includes a first port coupled to said output port and a second port receiving additional input radiation.

10. The apparatus of claim 9, wherein said optical frequency converter comprises a waveguide having first and second end faces, and wherein said first port is said first end face and said second port is said second end face.

11. The apparatus of claim 9, wherein said optical frequency converter comprises a waveguide having first and second end faces, and wherein said first port is said first end face and said second port is provided by a directional coupler including said waveguide and disposed between said first and second end faces.

12. The apparatus of claim 1, wherein said optical frequency converter comprises a wavelength selective reflector for wavelength selective output coupling.

13. The apparatus of claim 1, wherein said optical frequency converter comprises a wavelength selective reflector for wavelength selective resonance.

14. The apparatus of claim 1, wherein said optical frequency converter comprises a wavelength selective loss element.

15. The apparatus of claim 1, wherein said optical frequency converter comprises a material selected from the group consisting of lithium niobate, lithium tantalate, potassium titanyl phosphate, potassium niobate, quartz, silica, silicon oxy-nitride, gallium arsenide, lithium borate, or beta-barium borate.

16. The apparatus of claim 1, wherein said optical frequency converter comprises a structure selected from the group consisting of bulk structures, waveguides, quantum well structures, quantum wire structures, quantum dot structures, photonic bandgap structures, and multi-component waveguide structures.

17. The apparatus of claim 1, wherein said optical frequency converter provides one or more processes selected from the group consisting of harmonic generation, sum frequency generation, difference frequency generation, parametric generation, parametric amplification, parametric oscillation, three-wave mixing, four-wave mixing, stimulated Raman scattering, stimulated Brillouin scattering, stimulated emission, acousto-optic frequency shifting and electro-optic frequency shifting.

18. The apparatus of claim 1, wherein said optical frequency converter is phase matched.

19. The apparatus of claim 18, wherein said optical frequency converter is quasi-phase-matched.

20. The apparatus of claim 19, wherein said optical frequency converter comprises a ferroelectric material having poled domains.

21. The apparatus of claim 20, wherein said poled domains are periodically poled or aperiodically poled.

22. The apparatus of claim 18, wherein said optical frequency converter is birefringently phase-matched.

23. The apparatus of claim 1, wherein said optical frequency converter has a wavelength full-width half maximum bandwidth greater than about 0.01% of a wavelength of said combined optical radiation.

24. The apparatus of claim 1, wherein said combiner comprises a wavelength dispersive element.

25. The apparatus of claim 24, wherein said wavelength dispersive element comprises an element selected from the group consisting of arrayed waveguide gratings, reflective diffraction gratings, transmissive diffraction gratings, holographic optical elements, assemblies of wavelength-selective filters, and photonic band-gap structures.

26. The apparatus of claim 1, wherein each of said input ports and said output port are single spatial mode ports.

27. The apparatus of claim 1, wherein each of said input ports has a corresponding input port wavelength range for efficient coupling to said combiner output port and wherein said wavelength ranges are substantially non-overlapping.

* * * * *